(12) United States Patent
Manassen et al.

(10) Patent No.: US 6,999,219 B2
(45) Date of Patent: Feb. 14, 2006

(54) OPTICAL MODULATOR

(75) Inventors: Amnon Manassen, Haifa (IL); Ori J. Braun, Palo Alto, CA (US); Giora Yahav, Haifa (IL)

(73) Assignee: 3DV Systems, Ltd., Yokneam (IL)

( * ) Notice: Subject to any disclaimer, the term of this patent is extended or adjusted under 35 U.S.C. 154(b) by 0 days.

(21) Appl. No.: 10/470,826

(22) PCT Filed: Feb. 14, 2001

(86) PCT No.: PCT/IL01/00143

§ 371 (c)(1),
(2), (4) Date: Jan. 15, 2004

(87) PCT Pub. No.: WO02/061498

PCT Pub. Date: Aug. 8, 2002

(65) Prior Publication Data

US 2004/0125429 A1    Jul. 1, 2004

(30) Foreign Application Priority Data

Jan. 30, 2001   (WO) .............. PCT/IL01/00090

(51) Int. Cl.
*G02F 1/01* (2006.01)
(52) U.S. Cl. .............. 359/240; 359/248; 359/244; 385/5; 385/8
(58) Field of Classification Search .............. 359/240, 359/248, 237, 243, 244; 385/5, 8
See application file for complete search history.

(56) References Cited

U.S. PATENT DOCUMENTS

| | | |
|---|---|---|
| 4,525,687 A | 6/1985 | Chemla et al. |
| 4,727,341 A | 2/1988 | Nishi et al. |
| 4,818,079 A | 4/1989 | Maserjian |
| 4,863,245 A | 9/1989 | Roxlo |
| 4,915,482 A | 4/1990 | Collins et al. |
| 4,952,792 A | 8/1990 | Caridi |
| 5,065,200 A | 11/1991 | Bhat et al. |
| 5,073,809 A | 12/1991 | Bigan et al. |
| 5,194,983 A | 3/1993 | Voisin |
| 5,210,428 A | 5/1993 | Goossen |
| 5,305,343 A | 4/1994 | Allovon et al. |
| 5,307,200 A | 4/1994 | Yoshida |
| 5,412,499 A | 5/1995 | Chiu et al. |
| 5,436,756 A | 7/1995 | Knox et al. |
| 5,455,451 A | 10/1995 | Usagawa et al. |

(Continued)

FOREIGN PATENT DOCUMENTS

EP    0 249 645    12/1987

(Continued)

OTHER PUBLICATIONS

Wood T. et al.; "High Speed Optical Modulation With GaAs/GaAlAs Quantum Wells in a p-i-n Diode Structure"; Jan. 1, 1984; Applied Physical Letter, vol. 44, No. 1; pp. 16-18.

(Continued)

*Primary Examiner*—Ricky L. Mack
*Assistant Examiner*—Brandi Thomas
(74) *Attorney, Agent, or Firm*—Fenster P. Co

(57) ABSTRACT

Provided is an optical modulator for modulating light comprising: a superlattice structure having a plurality of interleaved narrow and wide bandgap semiconductor layers, wherein wave functions of energy states of electrons and holes in different narrow bandgap layers are coupled; and a power supply that applies voltage to the superlattice structure between a first non-zero voltage and a second non-zero voltage to modulate the light.

38 Claims, 5 Drawing Sheets

U.S. PATENT DOCUMENTS 5,808,314 A 9/1998 Nakajima et al.
5,963,358 A * 10/1999 Shields ................... 359/248

FOREIGN PATENT DOCUMENTS

| EP | 0 345 971 | 12/1989 |
| JP | 62-226130 | 10/1987 |
| JP | 03-132717 | 6/1991 |
| JP | 06-244449 | 9/1994 |
| WO | WO 97/01111 | 1/1997 |
| WO | WO 99/40478 | 8/1999 |

OTHER PUBLICATIONS

Miller, D. et al.; "Band-Edge Electroabsorption in Quantum Well Structures: The Quantum-Confined Stark Effect"; Nov. 26, 1984; Physical Review Letters; vol. 56; No. 22; pp. 2173-2176.

Miller, D. et al.; "Electric Field Dependence of Optical Absorption Near the Band Gap of Quantum-Well Structures"; Jul. 15, 1985; Physical Review B; vol. 32; No. 2; pp. 1043-1060.

* cited by examiner

OPTICAL MODULATOR

RELATED APPLICATIONS

The present application is a US National Application of PCT/IL01/00143, filed on Feb. 14, 2001.

FIELD OF THE INVENTION

The invention relates to optical shutters and in particular to optical shutters based on semiconductor superlattice or multiple quantum well structures.

BACKGROUND OF THE INVENTION

Optical modulators based on semiconductor multiple quantum well (MQW) or superlattice (SL) structures are known.

An MQW structure comprises a stack of thin layers of narrow bandgap semiconductor material alternating with layers of wide bandgap semiconductor material so that each layer of narrow bandgap material is sandwiched between two layers of wide bandgap material. The alternating structure forms a series of quantum wells located in the narrow bandgap layers that are capable of confining conduction band electrons and valence band holes. Each narrow bandgap layer has a quantum well that confines conduction band electrons and a quantum well that confines holes in the valence band.

Width of the quantum wells in a narrow bandgap layer is substantially equal to the thickness of the narrow band layer. Generally, thickness of the narrow bandgap layers, and as a result, width of the quantum wells is substantially less than a diameter of an exciton that may be generated as an intermediate state when a photon excites an electron from the valence band to the conduction band of the narrow bandgap material. Depth of the electron quantum wells is substantially equal to a difference between bottoms of the conduction bands of the wide bandgap material and the narrow bandgap material. Depth of the hole quantum wells is substantially equal to a difference between tops of the valence bands of the wide bandgap and narrow bandgap materials.

In an MQW structure, depths of the quantum wells and thickness of the wide bandgap layers are such that a wave function of an electron or hole trapped in a quantum well of a narrow bandgap layer generally extinguishes rapidly in the wide bandgap layers on either side of the narrow bandgap layer. As a result, in an MQW structure, electrons and holes confined in quantum wells of a narrow bandgap layer are substantially isolated from electrons and holes confined in other narrow bandgap layers. Hereinafter, the wide bandgap layers are referred to as "barrier layers" and the narrow bandgap layers are referred to as "quantum well layers".

When an electric field is applied perpendicular to the planes of the layers in an MQW structure, energy levels of allowed wave functions for trapped electrons and trapped holes in the quantum wells of a same quantum well layer are displaced towards each other. As a result, a minimum amount of energy required to transfer an electron from the valence band to the conduction band and produce thereby an electron-hole pair is reduced and the absorption spectrum of the MQW is red shifted. The red shift is a result of a quantum confined Stark effect that reduces a minimum amount of energy required to excite an electron-hole exciton as an intermediate state in raising an electron from the valence band to the conducting band. Changes, on the order of 10,000 cm$^{-1}$ in an absorption coefficient for light having a wavelength, hereinafter an "operating wavelength", near an absorption edge of an absorption spectrum of an MQW structure can be realized by red shifting the absorption spectrum.

U.S. Pat. No. 4,525,687, the disclosure of which is incorporated herein by reference, describes a small aperture MQW optical shutter comprising 50 GaAs narrow band quantum well layers sandwiched between wide bandgap barrier layers formed from $Ga_{(1-x)}Al_xAs$ with x~0.36. The layers are formed in the intrinsic part of a pin diode. PCT Publication WO 99/40478, the disclosure of which is incorporated herein by reference, describes a wide aperture MQW high frequency optical modulator.

Performance of an MQW modulator is limited, inter alia, by an escape time for electrons and holes trapped in quantum wells of the MQW. Once holes and electrons are trapped in the MQW quantum wells of an MQW modulator after the modulator interacts with a beam of light, the electrons and holes require a finite escape time before they leave the quantum well region of the modulator. The same quantum wells that provide the modulating effects of an MQW modulator generally retard removal of the electrons and holes from the quantum wells. Buildup of photo-induced electrons and holes in quantum wells tends to shield and reduce effectiveness of electric fields applied to the MQW that are used to red shift the absorption spectrum of the modulator. In addition, current in the MQW layers generated by motion of the photo-induced electrons and holes in response to electric fields applied to the modulator can cause ohmic heating of the layers. The heating can result in an unwanted shift in the absorption edge of the modulator's absorption spectrum.

U.S. Pat. No. 5,210,428 to K. Goossen, the disclosure of which is incorporated herein by reference, notes that an article published in Applied Physics Letters, Vol. 57, No 22, pp suggests that escape times in an MQW modulator may be reduced by decreasing quantum well depth and barrier layer thickness. The patent describes an MQW modulator having a particular configuration of shallow quantum wells that results in reduced escape times. To provide the shallow quantum wells the effective bandgap energy of barrier layers in the modulator is chosen to be less than the sum of a longitudinal optical phonon energy and an exciton absorption energy in the modulator. U.S. Pat. No. 5,436,756 to W. H. Knox et. al. describes reducing current from photo-induced electrons in an MQW modulator by seeding the quantum well region of the modulator with non-radiative recombination centers such as protons.

A superlattice (SL) structure also comprises a series of quantum wells that are formed by a stack of quantum well layers sandwiched between barrier layers. However, in an SL, as distinguished from an MQW structure, widths of the barrier layers and heights of the quantum wells are such that wave functions of electrons and holes in quantum wells are not confined to individual quantum wells. There is substantial tunneling of electrons and holes between quantum wells. The wave functions in the quantum wells are relatively strongly coupled and in effect form extended wave functions that span substantially the full height of the stack of quantum well layers and have energies that form bands of allowed energies. When an electric field is applied to the SL perpendicular to the layers in the SL, coupling of wave functions between quantum wells is reduced and energies of allowed wave functions of electrons and holes in a same quantum well layer are displaced away from each other. The displacement is a result of narrowing of the widths of the energy bands defined by the allowed wave functions. As a result, a minimum amount of energy required to transfer an electron from the valence band of the quantum well layers to the conduction band in the quantum well layers is increased and the absorption spectrum of the MQW is blue shifted.

Optical modulators comprising SL structures are described in U.S. Pat. No. 5,194,983 to P. Voisin, the disclosure of which is incorporated herein be reference. Absorption spectra showing blue shifts for an SL structure having 4 nanometers thick layers are shown in the patent for different electric fields applied to the SL structure.

SLs in which absorption spectra of the SLs are red shifted are also possible. In "red shift" MQW modulators, red shifts that are used to modulate light are provided by changing energy differences of transitions, "direct transitions", that occur between allowed electron and hole energy states in a same quantum well layer. "Oblique" transitions between allowed states of electrons and holes in quantum wells in adjacent quantum well layers of an SL provide an absorption spectrum that is red shifted by application of an electric field. However, red shifts provided by oblique transitions generally result in changes in absorption coefficients for light that are substantially smaller than changes in absorption coefficients provided by "direct" red shifts. In order to provide desired On/Off ratios, SL modulators that use oblique transitions to modulate light must generally provide relatively long path lengths for the light through quantum well layers of the SL. U.S. Pat. No. 5,073,809 to E. Bigan et. al., the disclosure of which is incorporated herein by reference, describes a "red shift SL" modulator in which a quantum well layer functions as a core of a waveguide having sufficient length to provide a suitable On/Off ratio.

Because barrier layers are relatively thin in SLs, escape times for photo-induced electrons and holes in SLs are relatively short and SLs are not as sensitive to escape times as are MQW modulators. However, changes in absorption coefficients for light at an operating wavelength of an SL are substantially smaller than changes in absorption coefficients achievable for light at an operating wavelength of an MQW modulator. On/Off transmission ratios for SLs are therefore generally substantially less than On/Off transmission ratios achievable with MQW modulators.

SUMMARY OF THE INVENTION

Aspects of some embodiments of the present invention relate to providing an optical multilayer semiconductor modulator having a relatively reduced escape time for photo-induced electrons and holes and an On/Off transmission ratio comparable to that achievable with prior art MQW modulators.

An aspect of some embodiments of the present invention relates to providing an optical multilayer semiconductor modulator having relatively reduced current generated by motion of photo-induced electrons and holes in electric fields applied to the modulator.

An aspect of some embodiments of the present invention relate to providing an optical multilayer semiconductor modulator having a relatively large On/Off ratio per unit length of the modulator along the modulator's optical axis, compared to prior art MQW modulators.

An optical modulator, in accordance with an embodiment of the present invention, comprises an SL structure having quantum well layers sandwiched between relatively thin barrier layers and a power supply that biases the SL structure at a bias voltage at which the modulator functions similarly to an MQW modulator.

The bias voltage, in accordance with an embodiment of the present invention, generates an electric field in the SL structure that substantially decouples allowed wave functions of electrons and holes in quantum wells of different quantum well layers of the modulator. As a result, in the biased modulator, allowed electron and hole wave functions in quantum wells of the modulator are confined similarly to the way in which electron and hole wave functions are confined in a prior art MQW modulator. The biased SL structure is then operated, in accordance with an embodiment of the present invention, similarly to the manner in which a prior art MQW modulator is operated. Voltage applied by the power supply to the modulator is increased above the bias voltage to generate a red shift in an absorption spectrum of the quantum well layer material of the modulator. The red shift causes a substantial increase in an absorption coefficient for light at an operating wavelength of the modulator. Hereinafter, the bias voltage used to decouple wave functions in an SL structure, in accordance with an embodiment of the present invention, is referred to as a "decoupling voltage".

The inventors have found that changes in an absorption coefficient for light at an operating wavelength in quantum well material of a "decoupled SL modulator" operated as an MQW like modulator, in accordance with an embodiment of the present invention, can be substantially equal to changes in absorption coefficients of quantum well material achieved in prior art MQW modulators. In addition, because barrier layers comprised in the modulator are thinner than barrier layers in prior art MQW modulators, there is also more quantum well layer material per unit length along the modulator's optic axis than there is in prior art MQW modulators. Response of the quantum well material to voltage applied to an SL or MQW modulator substantially determines changes in absorption coefficient of light at the operating wavelength of the modulator. To the extent that a modulator comprises more quantum well material, an On/Off transmission ratio of the modulator generally increases. As a result, for a given voltage, On/Off transmission ratios for a modulator in accordance with an embodiment of the present invention, can often be equal to or greater than On/Off transmission ratios obtained with some prior art MQW modulators.

Because barrier layers in the modulator are thinner than barrier layers in prior art MQW modulators electron and hole escape times in the modulator are generally shorter than electron and hole escape times in prior art MQW modulators. In addition, when voltage applied to the modulator by the power supply is reduced below the decoupling voltage to a voltage at which wave functions in different quantum wells are "re-coupled", the modulator operates as an SL structure having even shorter electron and hole escape times. In the presence of a moderate electric field, which is generated by an appropriate voltage below the decoupling voltage used to morph the SL structure to the MQW structure, photo-induced charges are rapidly swept out of the SL structure.

In some embodiments of the present invention, barrier layers in the modulator are seeded with non-radiative recombination traps, such as non-radiative recombination traps known in the art that are generated by growing the barrier layers at low temperature. Quantum well layers are not seeded with traps. At the trap sites photo-induced electrons recombine relatively rapidly with photo-induced holes in a non-radiative recombination process. As a result, the recombination traps function to substantially reduce lifetimes of photo-induced electrons and holes in the modulator. The traps thereby contribute to rapid removal of photo-induced electrons and holes and reduction of current resulting from motion of the electrons and holes in electric fields applied to the modulator.

In some embodiments of the present invention, all of the barrier layers are seeded with non-radiative recombination traps. However, seeding layers with traps can be an expensive process. The inventors have found that effective reductions in lifetimes of photo-induced electrons and holes can be achieved and costs of seeding a modulator reduced by seeding only some of the barrier layers, in accordance with an embodiment of the present invention. For example, the inventors have found that seeding only every fourth layer in a modulator in accordance with an embodiment of the present invention, can provide substantial savings in fabrication costs of the modulator while still providing effective reduction in lifetimes of photo-induced electrons and holes in the modulator.

It is noted that whereas methods of seeding layers, in accordance with an embodiment of the present invention, are described for modulators having an SL structure, the methods are applicable to heterojunction structures in general, whether they are SL structures or MQW structures.

There is therefore provided in accordance with an embodiment of the present invention, an optical modulator for modulating light comprising: a superlattice structure having a plurality of interleaved narrow and wide bandgap semiconductor layers, wherein wave functions of energy states of electrons and holes in different narrow bandgap layers are coupled; and a power supply that applies voltage to the superlattice structure between a first non-zero voltage and a second non-zero voltage to modulate the light.

Optionally, at the first voltage the wave functions are decoupled and the modulator has an absorption spectrum having an absorption edge determined by transitions between energy states in a same narrow bandgap layer. Optionally, at the second voltage the absorption edge is red shifted.

In some embodiments of the present invention, the optical modulator has an absorption spectrum having an absorption edge when zero voltage is applied by the power supply to the modulator and the absorption edge at the first voltage is blue shifted with respect to the absorption edge at zero voltage. Optionally, the absorption edge at the second voltage is red shifted with respect with respect to position of the absorption edge at the first voltage.

In some embodiments of the present invention, the second voltage is larger than the first voltage.

Optionally, following application of the second voltage, the power supply applies a voltage less than the first voltage to the modulator to remove electrons and holes generated therein by passage of the light therethrough.

In some embodiments of the present invention, substantially none of the narrow bandgap layers and at least one of the wide bandgap layers is seeded with non-radiative electron traps. Optionally, the at least one wide bandgap layers comprises all the wide bandgap layers. Optionally, the at least one wide bandgap layer comprises some but not all the wide bandgap layers. Optionally, the at least one wide bandgap layer comprises every other wide bandgap layer. Optionally, the at least one wide bandgap layer comprises every fourth wide bandgap layers. In some embodiments of the present invention the traps in a wide bandgap layer are generated by growing the wide bandgap layer at low temperature.

In some embodiments of the present invention, the thickness of the narrow bandgap layers is less than or equal to 10 nanometers. Optionally, the thickness of the narrow bandgap layers is substantially equal to 3 nanometers.

In some embodiments of the present invention, the thickness of the wide bandgap layers is less than or equal to 6 nanometers. Optionally, the thickness of the wide bandgap layers is substantially equal to 3 nanometers.

In some embodiments of the present invention, a ratio of thickness of a wide bandgap layer to a narrow bandgap layer is greater than or equal to one. Optionally, the ratio is greater than or equal to two. Optionally, the ratio is greater than or equal to three.

In some embodiments of the present invention, the number of narrow bandgap layers comprised in the superlattice structure is greater than 50. Optionally, the number of narrow bandgap layers comprised in the superlattice structure is substantially equal to 200. Optionally the number of narrow bandgap layers comprised in the superlattice structure is substantially equal to 300.

In some embodiments of the present invention, the superlattice structure is formed in an intrinsic region of a pin diode.

In some embodiments of the present invention, the first voltage is less than 30 volts. Optionally, the first voltage is less than 15 volts. Optionally, the first voltage is between 5 and 10 volts. Optionally, the first voltage is substantially equal to 25 volts. In some embodiments of the present invention, the second voltage is a voltage between 25–55 volts.

In some embodiments of the present invention, the narrow bandgap layers are formed form GaAs. In some embodiments of the present invention, the wide bandgap layers are formed from $Al_xGa_{(1-x)}As$. Optionally, x is less than or equal to 0.7. Optionally, x is substantially equal to 0.3.

There is further provided in accordance with an embodiment of the present invention, a method of modulating intensity of a beam of light comprising: applying a non-zero voltage to a superlattice structure having a plurality of interleaved narrow and wide bandgap semiconductor layers so as to determine a transmittance for the light in the structure, wherein in the absence of voltage applied to the superlattice structure, wave functions of energy states of electrons and holes in different narrow bandgap layers are coupled; directing the light so that it is incident on the structure; and applying a second non-zero voltage different from the first voltage to the structure to change the transmittance and modulate thereby the light.

Optionally, at the first voltage the wave functions are decoupled and the modulator has an absorption spectrum having an absorption edge determined by transitions between energy states in a same narrow bandgap layer. Optionally, at the second voltage the absorption edge is red shifted with respect to position of the absorption edge at the first voltage Alternatively or additionally, the absorption edge at the first voltage is blue shifted with respect to an absorption edge of an absorption spectrum that characterizes the modulator in the absence of voltage applied to the superlattice structure.

In some embodiments of the present invention, the second voltage is larger than the first voltage.

In some embodiments of the present invention, following application of the second voltage, a voltage less than the first voltage is applied to the modulator to remove electrons and holes generated therein by the passage of the light beam therethrough.

There is further provided in accordance with an embodiment of the present invention, an optical modulator comprising: a multilayer heterojunction structure comprising a plurality of interleaved narrow and wide bandgap semiconductor layers; and non-radiative traps located in at least one of the wide bandgap layers and substantially none of the narrow bandgap layers.

Optionally, the at least one wide bandgap layers comprises all the wide bandgap layers. Optionally, the at least one wide bandgap layer comprises some but not all the wide bandgap layers. Optionally, the at least one wide bandgap layer comprises every other wide bandgap layer. Optionally, the at least one wide bandgap layer comprises every fourth wide bandgap layers. In some embodiments of the present invention, the traps in a wide bandgap layer are traps generated by growing the wide bandgap layer at low temperature.

BRIEF DESCRIPTION OF FIGURES

Non-limiting examples of embodiments of the present invention are described below with reference to figures attached hereto. In the figures, identical structures, elements or parts that appear in more than one figure are generally labeled with the same numeral in all the figures in which they appear. Dimensions of components and features shown in the figures are chosen for convenience and clarity of presentation and are not necessarily shown to scale. The figures are listed below.

DETAILED DESCRIPTION OF EXEMPLARY EMBODIMENTS

Figure 1A:
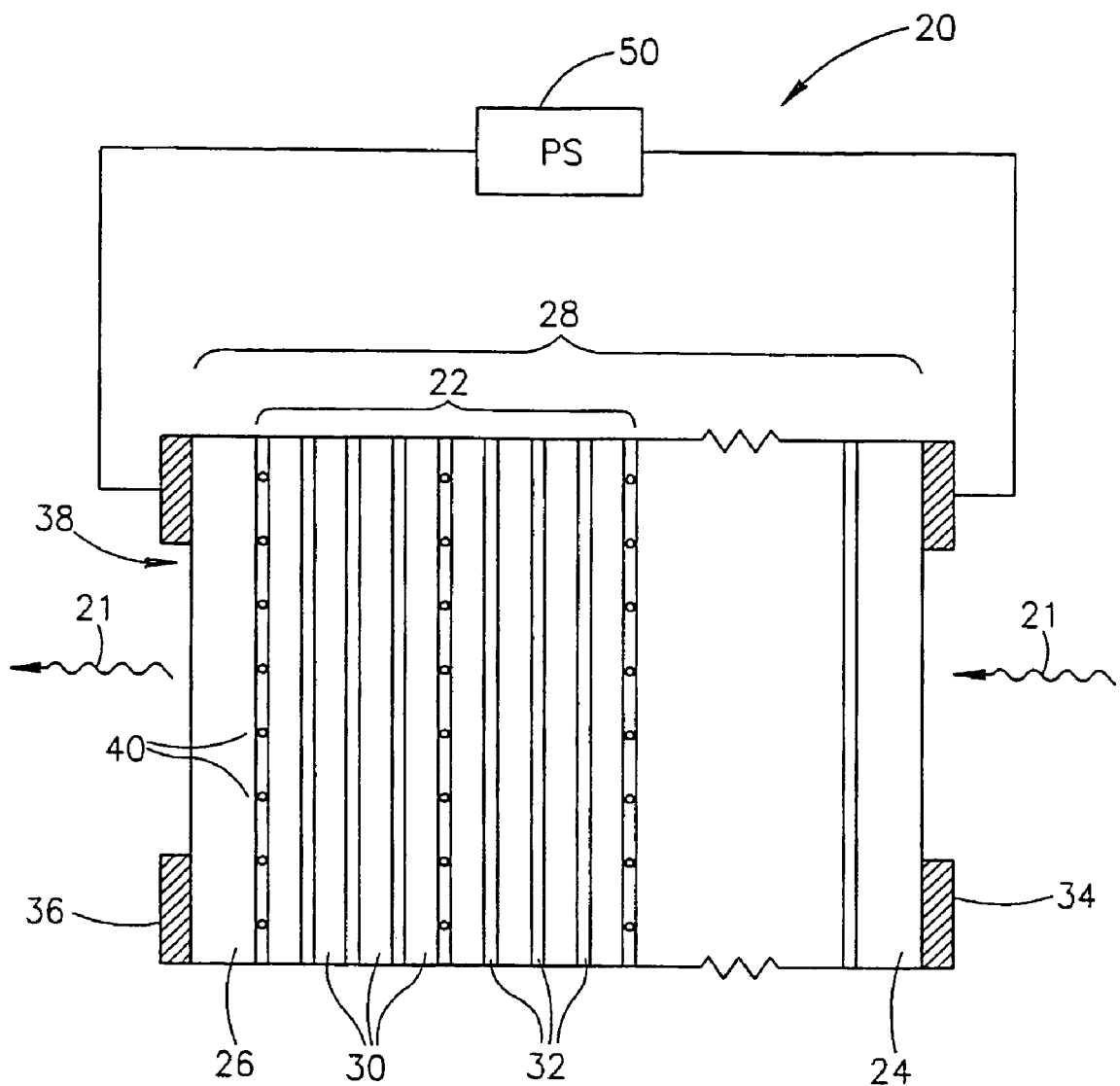
FIG. 1A schematically shows a cross sectional view of an optical modulator having an SL structure, in accordance with an embodiment of the present invention.

FIG. 1A shows a schematic cross section view of an optical modulator 20 in accordance with an embodiment of the present invention. Optical modulator 20 comprises an epitaxial superlattice, i.e. SL, structure 22, formed between heavily p doped layer 24 and heavily n doped layer 26. SL structure 22 and heavily doped layers 24 and 26 form a pin diode 28. SL structure 22 comprises a plurality of narrow bandgap "quantum well" layers 30 alternating with wide bandgap barrier layers 32. Only a few of quantum well layers 30 and barrier layers 32 are shown in FIG. 1A. It is noted that the words "narrow" and "wide" refer to bandgaps in layers 30 and 32 and not to thickness of the layers.

Narrow bandgap quantum well layers preferably have a thickness less than a diameter of an electron-hole exciton in the material of quantum well layers 30. Typically, thickness of quantum well layers 30 is equal to or less than 10 nanometers. In order for electron and hole wave functions in different quantum well layers to be strongly coupled, preferably barrier layers 32 are substantially thinner than quantum well layers 30.

Ohmic contact electrodes 34 and 36, shown shaded, are provided on layers 24 and 26 respectively using methods known in the art. Electrodes 34 and 36, as shown in FIG. 1A, are optionally formed in a shape of a "picture" frame having an open central region 38. Central regions 38 of electrodes 34 and 36 define apertures of the modulator through which light enters and/or leaves modulator 20. Various other types of contact electrodes, such as those described in above referenced PCT Publication WO 99/40478 referenced above, may be used in the practice of the present invention. Light that is modulated by modulator 20 is schematically represented by wavy arrows 21 shown entering and leaving modulator 20.

In some embodiments of the present invention, barrier layers 32 are seeded with non-radiative traps, such as traps generated by growing the layers at low temperature. In some embodiments of the present invention, all barrier layers 32 are seeded with traps. However, seeding can be an expensive process. Therefore, in some embodiments of the present invention only some of barrier layers 32 are seeded. By seeding only some barrier layers rather than all barrier layers, cost of seeding for modulator 20 can be reduced. In FIG. 1A, only every fourth barrier layer 32 is seeded with traps, which are represented by circles 40. Traps 40 serve as non-radiative recombination centers for photo-induced electrons and holes generated in modulator 20 and thus reduce their lifetime.

Modulator 20 comprises a power supply 50 that applies voltage to electrodes 34 and 36 to modify wave functions and energies of allowed electron and hole states in quantum wells of quantum well layers 30. By modifying the energy levels of the allowed states, power supply 50 controls transmittance of modulator 20 to light at an operational wavelength of the modulator.

In accordance with an embodiment of the present invention, power supply 50 back biases pin diode 28 with a decoupling voltage, so as to decouple electron and hole wave functions in the quantum wells that are normally strongly coupled as a result of the SL structure of quantum well and barrier layers 30 and 32. At the decoupling voltage, SL structure 22 has an absorption spectrum having an absorption edge that can be red shifted to modulate light at the operating wavelength of modulator 20. In accordance with an embodiment of the present invention power supply 50 red shifts the absorption edge by increasing voltage applied to pin diode 28 above the decoupling voltage. As a result of the red shift, the absorption coefficient in material of quantum well layers 30 of modulator 20 increases and transmittance of the modulator decreases for light at the operational wavelength of the modulator.

Following a period during which the absorption edge of modulator 20 is red shifted and photo-induced electrons and holes are generated by light at an operational wavelength incident on the modulator, the electrons and holes recombine and/or drift out of SL structure 22. The escape time of the electrons and holes is shorter than in prior art MQW modulators because barrier layers 32 are relatively thinner than barrier layers in prior art MQW modulators.

In addition, in some embodiments of the present invention, following a period during which the absorption edge is red shifted and photo-induced electrons and holes are generated, power supply 50 back biases pin diode 28 with a moderate voltage that is less than the decoupling voltage. At the reduced bias voltage the electron and hole wave functions in the quantum wells of quantum well layers 30 are "recoupled". As a result, photo-induced electrons and holes that may be trapped in quantum wells of SL structure 22 are more easily able to tunnel between the quantum wells and are relatively rapidly swept out of SL structure 22.

Preferably, the density of traps 40 in barrier layers 32 is such that an average effective recombination path length resulting from the traps for an electron or hole being swept out at the reduced voltage is substantially shorter than the width of superlattice structure 22. As a result, substantially all electrons and holes that are being swept out at the reduced bias voltage are trapped and recombine in barrier layers 32 that are seeded with traps and do not reach electrodes 34 and 36 respectively.

The inventors have experimentally verified a red shift in a modulator, in accordance with an embodiment of the present invention, similar to modulator 20. The modulator had an SL structure 22 comprising 280 quantum well layers 30 and 281 barrier layers 32. Narrow gap layers 30 were formed from GaAs and wide gap layers 32 formed from $Al_xGa_{(1-x)}As$ with x~0.3. Both narrow and wide bandgap layers 30 and 32 were about 3 nanometers thick, resulting in a total thickness for SL structure 22 of about 1.68 microns. The modulator had an operating wavelength at about 787.5 nanometers.

Figure 1B:
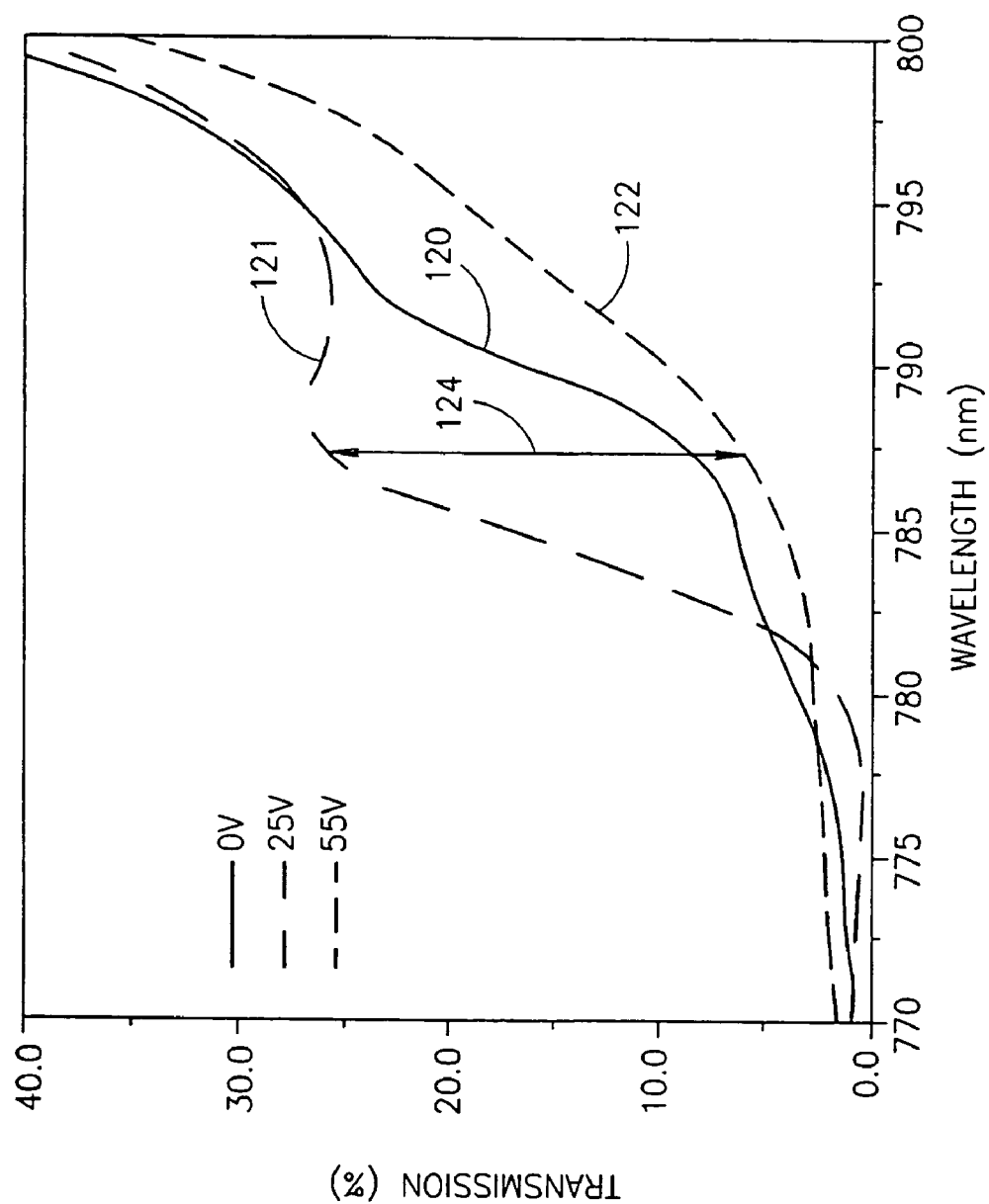
FIG. 1B is a graph of experimentally determined absorption edges showing a red shift following a blue shift for an optical modulator similar to the optical modulator shown in FIG. 1A, in accordance with an embodiment of the present invention.

Electron and hole wave functions in the modulator are decoupled when power supply 50 applied a voltage of about 25 volts to the modulator. The red shift was observed for voltages above the decoupling voltage. FIG. 1B is a graph of experimentally determined absorption edges 120, 121 and 122 for the modulator at 0 volts, 25 volts and 55 volts respectively. Absorption edge 121 obtained at 25 volts is blue shifted with respect to absorption edge 120 at 0 volts. Absorption edge 122 at 55 volts is red shifted with respect to both absorption edge 121 and absorption edge 120. At voltages intermediate 25 and 55 volts, absorption edges are obtained that are red shifted with respect to absorption edge 121 less than the amount by which absorption edge 122 at 55 volts is red shifted. At an operating wavelength of 787.5 nanometers a difference between absorption edge 121 and absorption edge 122, which is indicated by double arrowhead line 124 provides an On/Off transmission ration of about 4.

It is noted that modulators, in accordance with embodiments of the present invention, can have values for structural and operational parameters that are different from those given above. Decoupling voltages can be other than 25 volts, barrier layer thickness are not limited to thickness of about 3 nanometers and values of x other than 0.3 can be advantageous. Furthermore, modulators in accordance with embodiments of the present invention can have a number of quantum well layers that is more or less than 280 and provide On/Off ratios other than 4. Substantially any SL structure for which a decoupling voltage can be established and for which a voltage greater than the decoupling voltage red shifts an absorption edge of the SL structure can be used in the practice of the present invention.

Advantageous values for x are expected to be below 0.7 and advantageous thickness for barrier and quantum well layers are expected to be less than about 6 nanometers and 10 nanometers respectively. In addition, to increase On/Off transmission ratio per unit length along the axis of a modulator it is advantageous that quantum well layers have greater thickness than barrier layers. In some embodiments of the present invention a ratio of quantum well thickness to barrier layer thickness is greater than 2. In some embodiments of the present invention the ratio is greater than 3. Advantageous values for decoupling voltages are expected to be less than 30 volts. In some embodiments of the present invention a decoupling voltage is less than 15 volts. It is expected that an advantageous number of quantum well layers in a modulator in accordance with an embodiment of the present invention is equal to or greater than 50. In some embodiments of the present invention, the number of quantum well layers is greater than 200. In some embodiments of the present invention, the number of quantum, well layers is greater than 300.

For example, the inventors expect that a modulator similar to that used to provide the experimental results shown in FIG. 1B, but having narrow bandgap GaAs layers 30 about 8 nanometers thick instead of 3 nanometers thick, will have a decoupling voltage in a range from 5–10 volts. The decoupling voltage is reduced compared to the decoupling voltage in the "experimental modulator" because energy bands in the 8 nanometers narrow bandgap layers 30 (i.e. the quantum well layers) are narrower than those in the 3 nanometers quantum well layers of the experimental modulator. In addition, it is expected that as a result of the increased thickness of narrow bandgap GaAs layers 30, that an On/Off transmission ratio for the modulator is expected to be about 20.

It is noted that whereas the above example of a modulator comprises a superlattice based on GaAs, superlattices comprised in modulators in accordance with embodiments of the present invention can be based on other III-V element combinations.

Figure 2A:
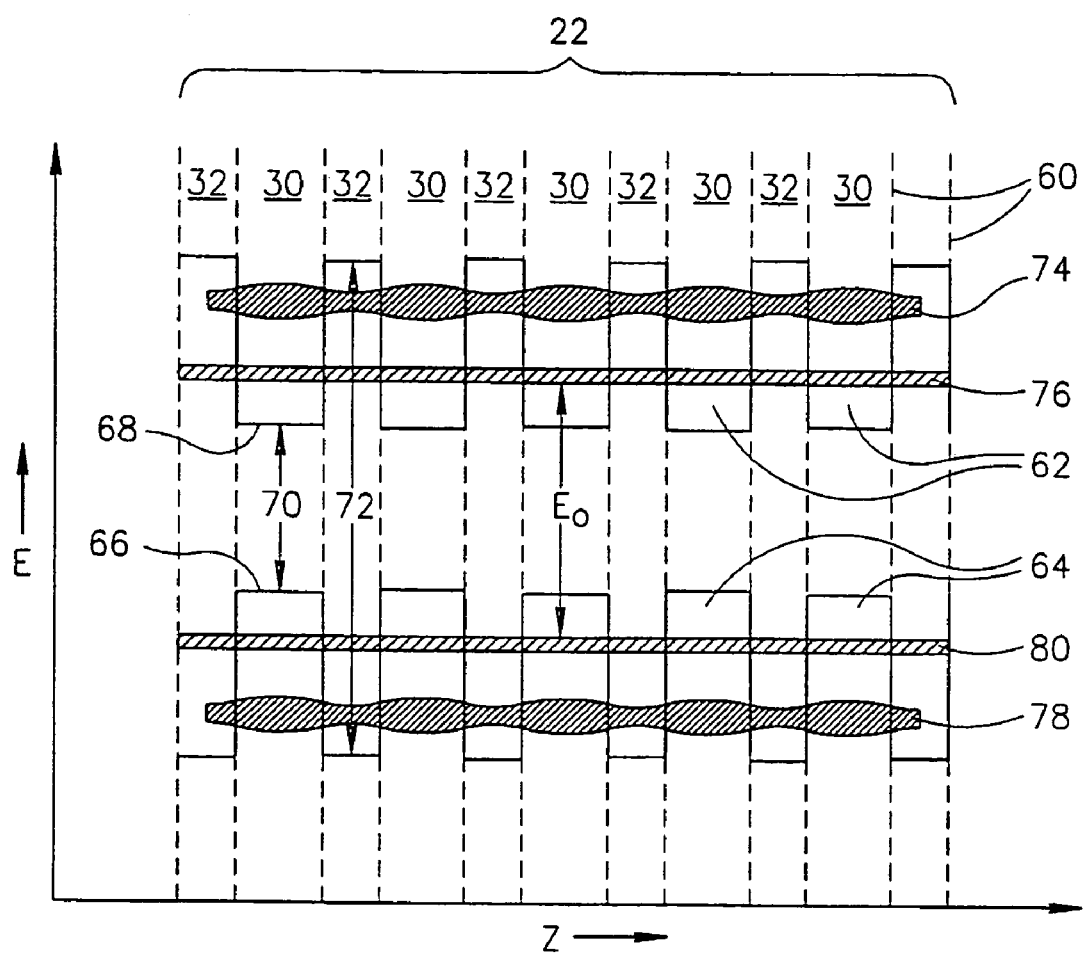
FIG. 2A schematically shows wave functions and energy levels of allowed energy states of electrons and holes in quantum wells of the SL structure of the optical modulator shown in FIG. 1A in the absence of an electric field applied to the modulator, in accordance with an embodiment of the present invention.
Figure 2B:
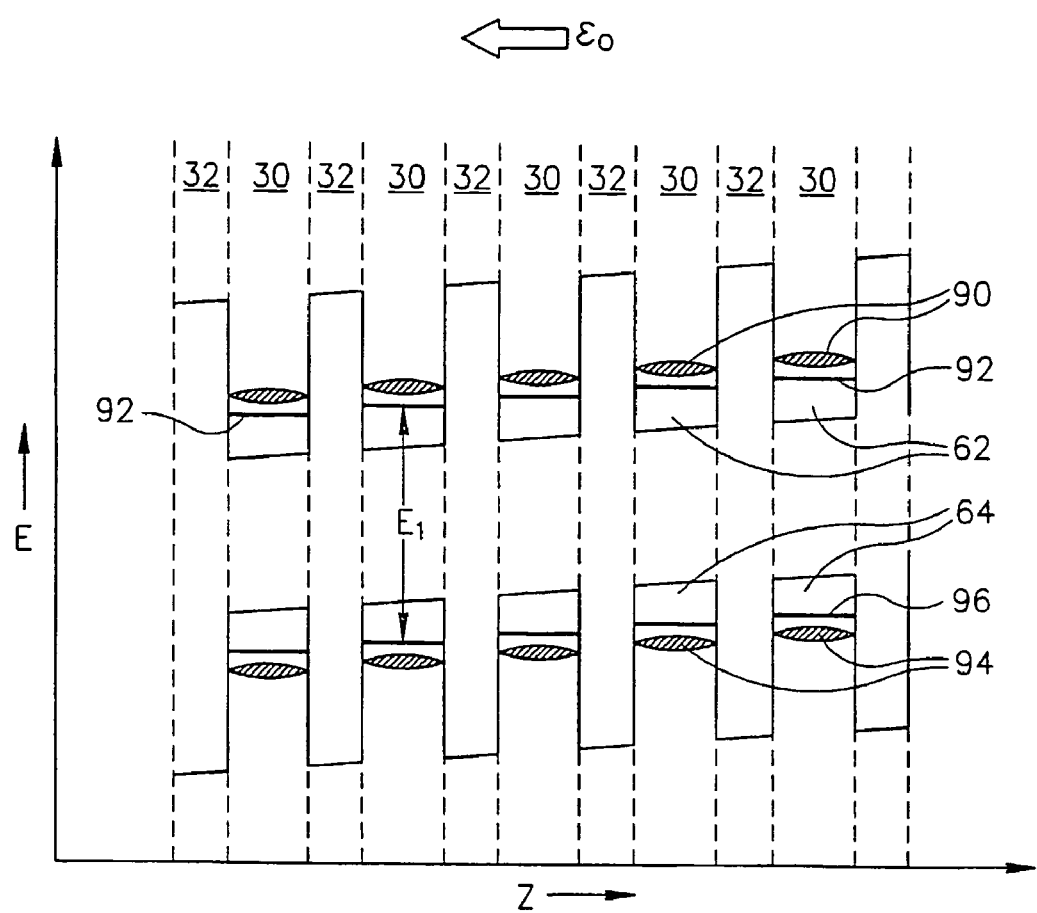
FIG. 2B schematically shows allowed wave functions of electrons and holes in the SL structure of the modulator shown in FIGS. 1A and 2A and their energy levels, when a decoupling voltage is applied to the modulator.
Figure 2C:
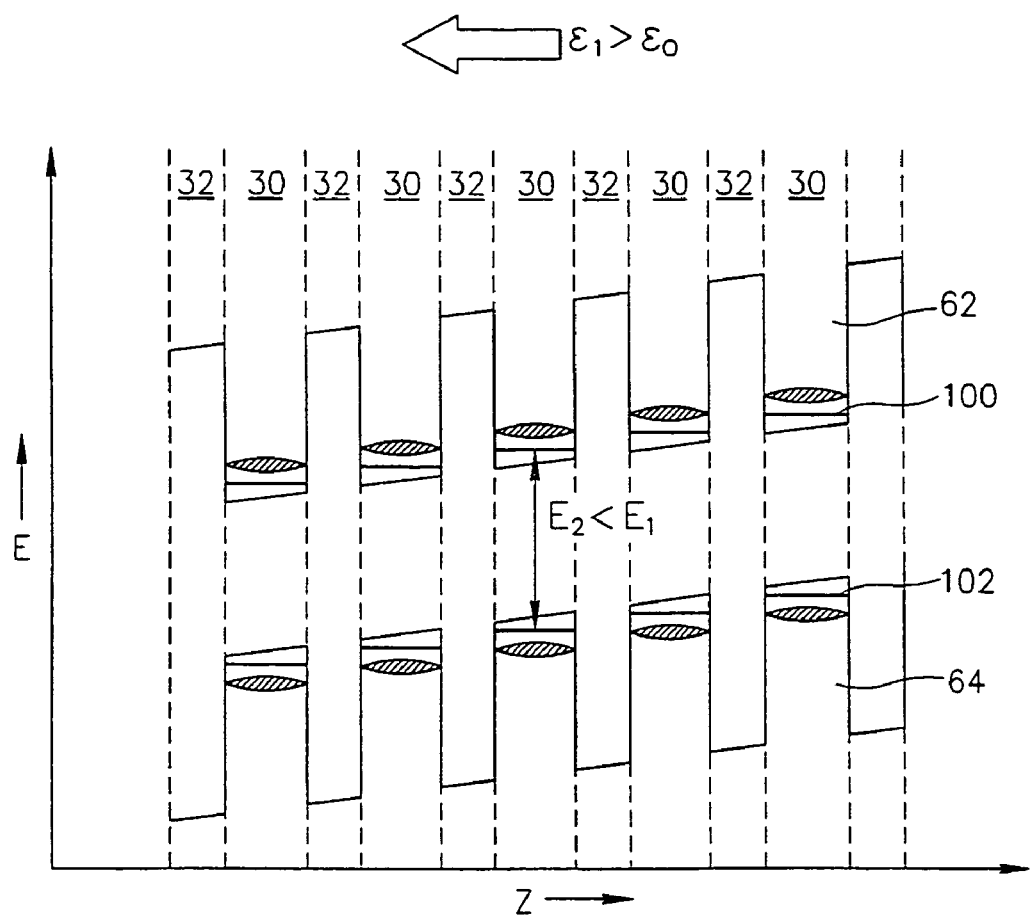
FIG. 2C schematically shows effects on electron and hole wave functions in the modulator shown in FIGS. 1A, 2A–2B when a voltage greater than the decoupling voltage is applied to the modulator.

FIGS. 2A–2C schematically illustrate effects of voltage applied to pin diode 28 by power supply 50 on energies and wave functions corresponding to lowest allowed energy states of electron and holes in quantum wells in SL structure 22.

Each of FIGS. 2A–2C shows a graph of the energy of the top of the valence band and the bottom of the conduction band in SL structure 22 as a function of position along a direction perpendicular to the planes of quantum well layers 30 and barrier layers 32 in the SL structure. In the graphs, direction perpendicular to the layers is referred to as the z-direction and displacement along the z-direction is measured in arbitrary units along the abscissa. Boundaries between quantum well and barrier layers 30 and 32 are indicated with dashed lines 60. Energy, in arbitrary units is measured along the ordinate.

FIG. 2A schematically shows electron and hole quantum wells 62 and 64 respectively, which are formed in quantum well layers 30 of SL structure 22 as a result of differences in the bandgaps of quantum well layers 30 and barrier layers 32. Energy of the top of the valence band in SL structure 22 as a function of z is indicated by a line 66, which shows a difference in energy of the top of the valence band between quantum well layers 30 and barrier layers 32. Energy of the bottom of the conduction band in SL structure 22 as a function of z is indicated by a line 68, which shows a difference in energy of the bottom of conduction band between quantum well layers 30 and barrier layers 32. A narrow bandgap of a quantum well layer 30 is indicated by arrowhead line 70 and a wide bandgap of an adjacent barrier layer 32 is indicated by an arrowhead line 72.

In FIG. 2A power supply 50 does not apply a voltage difference between electrodes 34 and 36 of pin diode 28 and there is no electric field in SL structure 22. Wave functions of allowed states of electrons in quantum wells 62 are strongly coupled and their energies form allowed energy bands for electron states in the SL structure. The wave functions at a given allowed energy in different quantum wells 62 are in resonance and "meld" together so that they appear as a single extended wave function that spans all the layers in SL structure 22. Electrons tunnel relatively easily through barrier layers 32 and move relatively freely between quantum wells 62 in different quantum well layers 30. As a result, the electrons are able to move relatively freely within substantially all the volume of SL structure 22.

Amplitude of "melded" wave functions of a lowest allowed energy state of electrons in quantum wells 62 is schematically represented by width of a shaded band 74 shown in FIG. 2A. An energy band of SL structure 22 determined by lowest energy states of the quantum wells is schematically represented in FIG. 2A by a shaded band 76. Width of band 76 represents an energy spread of the states that define the energy band. Similarly, wave functions of holes in quantum wells 64 are strongly coupled and define energy bands of allowed states of holes in quantum wells 64. Holes are also able to move relatively freely within substantially all the volume of SL structure 22. (Though, because of their greater effective mass, generally, the holes are more sluggish and tend to be more confined by the quantum well structure than electrons.) Amplitude of coupled wave functions as a function of z of a lowest energy state for holes in quantum wells 64 is schematically represented by width of a shaded band 78. A shaded band 80 represents an energy band of the lowest energy states of the holes in quantum wells 64.

In the absence of an applied electric field, a minimum amount of energy "$E_o$" equal to an energy difference between the top of band 80 and the bottom of band 76 is required to raise an electron from the valence band to the conduction band of modulator 20. A double arrowhead line labeled with the minimum energy $E_o$ indicates graphically the minimum energy required to raise an electron to the conduction band.

In FIG. 2B power supply 50 applies a decoupling bias voltage between electrodes 34 and 36, in accordance with an embodiment of the present invention. The decoupling voltage generates an electric field "$\epsilon_o$" in SL structure 22 that modifies the shape of quantum wells 62 and 64 and decouples wave functions of electron and hole states in different quantum wells. Direction of electric field $\epsilon_o$ is indicated by the direction of a block arrow labeled by $\epsilon_o$ and potential energy increases in the positive z direction. As a result of the applied field $\epsilon_o$ electron states in adjacent quantum wells 62 are shifted out of resonance. The electron wave functions are decoupled and become relatively localized to regions of quantum wells 62. In addition, widths of energy bands (e.g. widths of energy bands 76 and 80 shown in FIG. 2A) of wave functions in quantum wells 62 decrease and each energy band becomes an energy level with well defined energy.

Amplitude of "confined" electron wave functions for electrons in lowest energy states of quantum wells 62 are schematically represented by tapered bands 90 located in the quantum wells. Energy levels of of the lowest electron energy states in quantum wells 62 are schematically represented by lines 92.

Hole wave functions are similarly decoupled and confined to regions of quantum wells 64 and hole energy bands converge to energy levels in the presence of $\epsilon_o$. Amplitude of confined hole wave functions for holes in lowest energy states of quantum wells 64 are schematically represented by tapered bands 94 located in the quantum wells. Energy levels of the lowest hole energy states in quantum wells 64 are schematically represented by lines 96.

An energy difference between the centers of a hole energy band 76 and an electron energy band 80 in a same quantum well layer shown in FIG. 2A is substantially the same as an energy difference between corresponding energy levels 92 and 96 shown in FIG. 2B. However, an energy difference between the top of energy band 76 and the bottom of energy band 80 in FIG. 2A is slightly less than an energy difference between energy levels 92 and 96. As a result, slightly more energy is required to raise an electron to the conduction band when power supply 50 applies a decoupling voltage to pin diode 28 and as in prior art there is a blue shift in the absorption spectrum of modulator 20. A minimum energy $E_1$, which is greater than $E_o$, is now required to raise an electron to the conduction band in modulator 20 in the presence of electric field $\epsilon_o$. A double arrowhead line labeled with $E_1$ indicates graphically the minimum energy $E_1$.

In FIG. 2C power supply 50 applies a voltage to pin diode 28 that is greater than the decoupling voltage to generate and electric field $\epsilon_1 > \epsilon_o$ in SL structure 22, in accordance with an embodiment of the present invention. Electric field $\epsilon_1$ operates on wave functions 90 and 94 in modulator 20 that are already confined to their respective quantum wells 30 and have their energy bands reduced to energy levels by electric field $\epsilon_o$. The inventors have found that an effect of the increase of electric field from $\epsilon_o$ to $\epsilon_1$ on the energy levels of the confined lowest energy states of quantum wells 62 and 64 is similar to the quantum confined Stark effect generated by an electric field in an MQW modulator. An electron energy level 92 in a quantum well 62 shown in FIG. 2B is shifted towards lower energies and moves closer to the bottom of the quantum well (i.e. the bottom of the conduction band in the quantum well layer in which the quantum well is located). Similarly, an energy level 96 for holes in a quantum well 64 shown in FIG. 2B is shifted towards lower energies and moves closer to the top of the quantum well. (It is to be noted that energy of hole states decreases towards the top of the valence band and when energy of a hole state approaches the top of the valence band the hole state approaches the bottom of its quantum well.) The shifted energy levels resulting from the increase in electric field from $\epsilon_o$ to $\epsilon_1$ are schematically shown as energy levels 100 and 102 in FIG. 2C.

The shifting of energy bands 92 and 96 that "transform" energy levels 92 and 96 into energy levels 100 and 102 respectively reduce a minimum energy required to raise an electron from the valence band to the conduction band of a quantum well layer 30. The minimum energy is equal to an energy difference, $E_2 < E_1$, between energy level 102 and energy level 100 in the layer. Energy difference $E_2$ is shown graphically in FIG. 2C by a double arrowhead line labeled by $E_2$.

As a result of the reduction in energy required to raise an electron to the conduction band of a quantum well layer 30 the absorption spectrum of modulator 20 is red shifted. The inventors have found that the red shift, in accordance with an embodiment of the present invention, can provide an On/Off transmission ratio for light at the operational wavelength of modulator 20 that substantially approaches or exceeds On/Off ratios achieved by some prior art MQW modulators.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. An optical modulator for modulating light comprising:
   a superlattice structure having a plurality of interleaved narrow and wide bandgap semiconductor layers, wherein wave functions of energy states of electrons and holes in different narrow bandgap layers are coupled, said superlattice having an absorption spectrum characterized by an absorption edge; and
   a power supply that applies voltage in a first range of voltages to the superlattice structure to modulate the light, which first voltage range is contiguous with a second lower voltage range and wherein in the first range the absorption edge red shifts and transmittance of the superlattice structure for the light decreases with increase in voltage and in the second range the absorption edge blue shifts and transmittance increases with increase in voltage.

2. An optical modulator according to claim 1 wherein in the first voltage range the wave functions are substantially decoupled and the absorption edge is determined by transitions between energy states in a same narrow bandgap layer.

3. An optical modulator according to claim 1 wherein following application of voltage in the first range, the power supply applies voltage in the second range to the modulator to remove electrons and holes generated therein by passage of the light therethrough.

4. An optical modulator according to claim 1 wherein substantially none of the narrow bandgap layers and at least one of the wide bandgap layers is seeded with non-radiative electron traps.

5. An optical modulator according to claim 4 wherein the at least one wide bandgap layers comprises all the wide bandgap layers.

6. An optical modulator according to claim 4 wherein the at least one wide bandgap layer comprises some but not all the wide bandgap layers.

7. An optical modulator according to claim 6 wherein the at least one wide bandgap layer comprises every other wide bandgap layer.

8. An optical modulator according to claim 6 wherein the at least one wide bandgap layer comprises every fourth wide bandgap layers.

9. An optical modulator according to claim 4 wherein the traps in a wide bandgap layer are generated by growing the wide bandgap layer at low temperature.

10. An optical modulator according to claim 1 wherein thickness of the narrow bandgap layers is less than or equal to 10 nanometers.

11. An optical modulator according to claim 10 wherein thickness of the narrow bandgap layers is substantially equal to 3 nanometers.

12. An optical modulator according to claim 1 wherein the thickness of the wide bandgap layers is less than or equal to 6 nanometers.

13. An optical modulator according to claim 12 wherein the thickness of the wide bandgap layers is substantially equal to 3 nanometers.

14. An optical modulator according to claim 1 wherein a ratio of thickness of a wide bandgap layer to a narrow bandgap layer is greater than or equal to one.

15. An optical modulator according to claim 14 wherein the ratio is greater than or equal to two.

16. An optical modulator according to claim 14 wherein the ratio is greater than or equal to three.

17. An optical modulator according to claim 1 wherein the number of narrow bandgap layers comprised in the superlattice structure is greater than 50.

18. An optical modulator according to claim 17 wherein the number of narrow bandgap layers comprised in the superlattice structure is substantially equal to 200.

19. An optical modulator according to claim 18 wherein the number of narrow bandgap layers comprised in the superlattice structure is substantially equal to 300.

20. A optical modulator according to claim 1 wherein the superlattice structure is formed in an intrinsic region of a pin diode.

21. An optical modulator according to claim 1 wherein the first range has a lower bound voltage less than 30 volts.

22. An optical shutter according to claim 21 wherein the lower bound of the first voltage range is less than 15 volts.

23. An optical modulator according to claim 22 wherein the lower bound of the first voltage range is between 5 and 10 volts.

24. An optical modulator according to claim 21 wherein the lower bound of the first voltage range is substantially equal to 25 volts.

25. An optical modulator according to claim 21 wherein the first voltage range is a voltage range between 25–55 volts.

26. An optical modulator according to claim 1 wherein the narrow bandgap layers are formed form GaAs.

27. An optical modulator according to claim 1 wherein the wide bandgap layers are formed from $Al_xGa_{(1-x)}As$.

28. An optical modulator according to claim 27 wherein x is less than or equal to 0.7.

29. An optical modulator according to claim 28 wherein x is substantially equal to 0.3.

30. A method of modulating intensity of a beam of light comprising:
   directing the beam of light so that it is incident on a superlattice structure having a plurality of interleaved narrow and wide bandgap semiconductor layers, wherein wave functions of energy states of electrons and holes in different narrow bandgap layers are coupled when voltage is not applied to the superlattice, said superlattice having an absorption spectrum characterized by an absorption edge; and
   applying voltage in a first range of voltages to the superlattice structure to modulate the light, which first voltage range is contiguous with a second lower voltage range and wherein in the first range the absorption edge red shifts and transmittance of the superlattice structure for the light decreases with increase in voltage and in the second range the absorption edge blue shifts and transmittance increases with increase in voltage.

31. A method according to claim 30 wherein in the first voltage range the wave functions are substantially decoupled and the absorption edge is determined by transitions between energy states in a same narrow bandgap layer.

32. A method according to claim 30 and comprising, following application of voltage in the first voltage range, applying voltage in the second voltage range to the modulator to remove electrons and holes generated therein by the passage of the light beam therethrough.

33. An optical modulator comprising:
   a multilayer heterojunction structure comprising a plurality of interleaved narrow and wide bandgap semiconductor layers; and
   non-radiative traps located in at least one of the wide bandgap layers and substantially none of the narrow bandgap layers.

34. An optical modulator according to claim 33 wherein the at least one wide bandgap layers comprises all the wide bandgap layers.

35. An optical modulator according to claim 33 wherein the at least one wide bandgap layer comprises some but not all the wide bandgap layers.

36. An optical modulator according to claim 35 wherein the at least one wide bandgap layer comprises every other wide bandgap layer.

37. An optical modulator according to claim 35 wherein the at least one wide bandgap layer comprises every fourth wide bandgap layers.

38. An optical modulator according to claim 33 wherein the traps in a wide bandgap layer are traps generated by growing the wide bandgap layer at low temperature.

* * * * *